July 1, 1958 E. T. YEO 2,840,898
METHOD OF MAKING A SNAP HOOK
Filed March 13, 1953
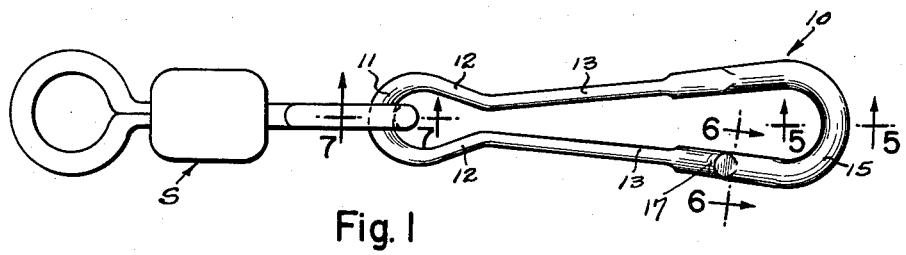
Fig. 1
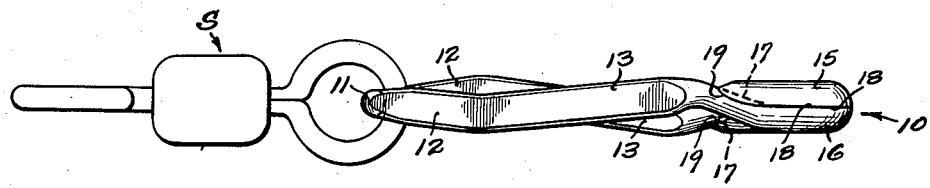
Fig. 2
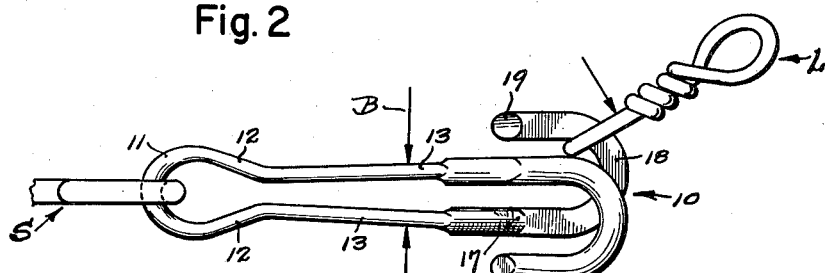
Fig. 3
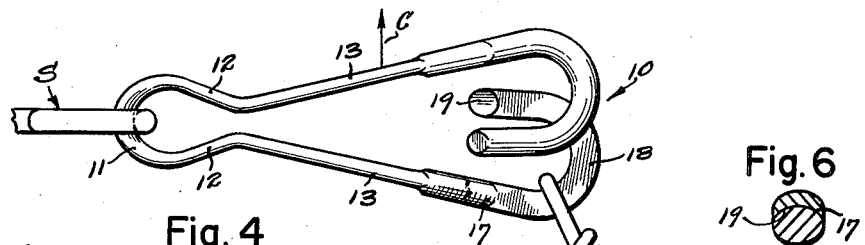
Fig. 4
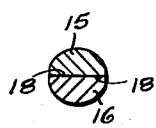
Fig. 5
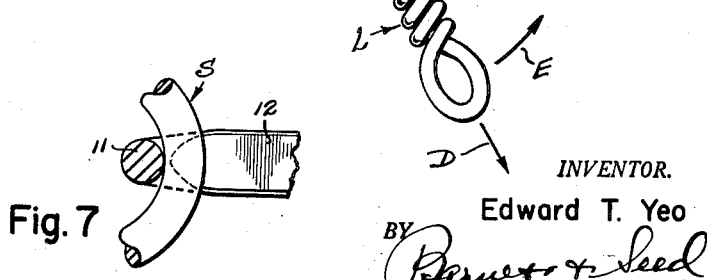
Fig. 6
Fig. 7
INVENTOR.
Edward T. Yeo
BY

United States Patent Office 2,840,898
Patented July 1, 1958

2,840,898

METHOD OF MAKING A SNAP HOOK

Edward T. Yeo, Seattle, Wash., assignor to Marine Specialty Mfg. Co., Seattle, Wash., a corporation of Washington Application May 13, 1953, Serial No. 354,679

3 Claims. (Cl. 29—551)

This invention relates to improvements in snap-hooks, and is a continuation-in-part of my pending application for Letters Patent of the United States, filed June 18, 1949, Ser. No. 99,964 and now abandoned. The general object of the invention is to provide a simple and inexpensive snap-hook which is efficient and reliable in the performance of its intended work, and namely that of detachably connecting two members in an in-line chain.

The hook of the present invention especially lends itself to use in the connecting hook-up between a fish-line and a fish lure, and to this end particularly aims to provide a device which may be easily and expeditiously coupled to or uncoupled from the eyed end of a leader or other like piece of fishing gear and give assured protection against accidental disengagement.

It is a further and important object to provide a snap-hook which is substantially proof against either the snap-hook itself or an associated piece to which it is coupled being fouled while in use.

The invention has the yet further and important object of devising a snap-hook embodying two oppositely directed bills arranged to normally overlie one another and which relies upon the resilient nature of the material composing the hook and the particular manner in which the same is made to yieldingly maintain the hook in a closed condition with the two bills in lapping registration and in meeting contiguity.

With the above and other objects and advantages in view, the invention consists in the process of manufacture and in certain novel features of construction, combination, and arrangement of parts, as will be hereinafter described and claimed.

In the accompanying drawing:

Figure 1 is a plan view illustrating a snap-hook constructed in accordance with the now-preferred embodiment of the present invention, and showing the same as being attached to a barrel-type eyed swivel. To all intents and purposes this attachment is permanent. In a fishing hook-up, the fish line is most usually attached to said swivel, and a leader to which the fishing lure is connected is attached to the snap end of the snap-hook.

Fig. 2 is a side elevational view of the snap-hook, with the swivel.

Fig. 3 is a fragmentary top plan view of the snap-hook and swivel combination, and illustrating a double-eyed pintle in process of being connected to the snap end of the snap-hook. A pintle rather than a leader is portrayed for purposes of simplifying the illustration.

Fig. 4 is a fragmentary top plan view of said snap-hook and swivel combination and showing the pintle in process of being disconnected from the snap end of the snap-hook.

Figs. 5 and 6 are transverse vertical sectional views drawn to an enlarged scale on line 5—5 and 6—6, respectively, of Fig. 1; and Fig. 7 is a large-scale fragmentary sectional view on line 7—7 of Fig. 1.

Referring to said drawing, the hook of the present invention, designated generally by the numeral 10, is in the nature of a double or match hook characterized in that the matching bills are made subject to the tensioning force of a spring to yieldingly hold the same in a normal closed condition in which one said bill substantially overlaps the other. Such spring and the two bills are made from one continuous piece of spring wire. The wire employed is brass by preference although any other material having a resiliency characteristic suitable for the purpose might perforce be used, and the type of wire which I find most suitable has the usual circular shape in cross-section.

The initial operation in forming my hook is to bring the wire upon itself at a point substantially midway between the ends in such a manner as to produce a tensioning loop 11 having a plan configuration suggesting a U and approaching an O, and which is to say such a loop as causes the end extremities 12 of the bend to converge inwardly without, however, being brought into touching contiguity. From the open throat thereby formed, the two strands of the wire diverge outwardly as at 13. In this initial formative step, performed under pressure between the opposing jaws of a clamping die, that portion of the wire in which is included the converging runs 12, and an adjacent fairly substantial portion of the diverging runs 13 is caused to be deformed in point of the sectional contour to establish a flattened shape, the median portion of the loop retaining its circular shape in section.

Following said initial bending and flattening, the free extremities of the two diverging limbs are each curled inwardly to produce hook-shaped bills 15 and 16 which, in the normal position of the shanks, substantially overlap one another in exact registering relation. I thereupon subject the curled ends to stamping pressure in performing what may perhaps be best termed a "coining" step which operates to create, at a point within the length of each limb coinciding with the free extremity of the other limb's lapping bill, a sloping jog 17, and at the same time giving to the underside of each bill a flat face 18. The swaged thickness given to each of the bills, considered normal to the plane of its flat underside, corresponds to the coining off-set, and thus causes the upper surface of each said bill to lie more or less flush with the related surface of the shank from which the other bill stems. During the course of the sequential steps leading to the coining, or in the preliminary procedure of clipping the wire to length, the end extremities are cut on the bias in such a manner as to compensate the same to the slope of the jog. A feature of importance is that the bias-cut surfaces 19 of said bill ends have their side edges slightly swaged in such a manner (see Fig. 6) as to draw the same downwardly in a minor degree over the sides of the other and underlying bill's root-end off-set. This is to say that the bias-cut surfaces are made sectionally concave and find a mating fit with the convex upperside of the jog 17 when the two bills are brought into registration. The effect is to normally yieldingly hold the two bills in exact registration and substantially precludes an eye which is caught in the bill end of the hook from liability of fouling.

While performing the coining step the two limbs are each tensioned in a manner urging the flat faces 18 of the two bills directly toward one another, and this tensioning is accomplished by deflecting the limbs oppositely of one another out of the plane occupied by said flat faces. I find that the tensioning is made most effective if the two strands of the wire lying between the sectionally round portion of the loop and the jogs 17 are each given a reverse bend which is opposite as between the two strands, and this is to say that the converging portions 12 of said strands are so deflected as to angle in the same direction in which the jog 17 slopes, and the diverging sections 13 of each limb are given a countering deflection angling in a direction opposite to the slope of said jog. This reverse bending, by spring-loading the loop of the snap-hook in a direction endwise to its axis, gives to the loop the characteristics of a volute spring in addition to its inherent sear-spring action. It is in connection with this volute tensioning that the initial deforming of the wire to give such angled portions 12 and 13 a flat shape in cross-section becomes significant, spring wire of normal circular contour being incapable of taking and holding a satisfactory twist tension.

It should be noted that the flattening is confined to the sides of the snap-hook, leaving the two ends, comprised in the one instance of the loop 11 and in the other instance of the lapped bills 15—16, both circular in cross-section. This gives to the snap-hook an ability to withstand a considerably higher pull force than would be the case were the ends flattened, and this is to say that a wire of flat shape in section, with the greater dimension normal to a plane in which the wire is to be bent, will collapse inwardly upon itself under a bending force of considerably less magnitude than is required to bend a wire of the same gauge having a circular cross-section.

As above stated, the snap-hook of the present invention has been primarily designed to fill the long-felt need for an easily operated and reliable connector to releasably couple a fish-line to a lure. In this usage, the snap-hook would desirably have the swivel S permanently caught in the eye formed by the loop 11. Assuming that it is desired to catch the link L in the eye formed at the other end of the snap-hook, the operator grasps the two shanks 13 between the thumb and forefinger of one hand and presses the same inwardly toward one another to responsively cause the bill ends of the hooked extremities to become exposed in the manner illustrated in Fig. 3. The arrows A and B in this view represent the compressive force exerted by the thumb and the forefinger. The operator then inserts either of said exposed bill-ends into the eyed end of the link and feeds the latter inwardly, the bills spreading in a direction endwise to the axial center line as the eyed end traverses the crossed sections of the bills. The flattening of the diverging shank portions 13 and the converging side portions 12 of the snap-hook, aside from the above-described advantage of permitting the loop to take and hold a tensioning twist, is of advantage from the standpoint of assuring for the user's thumb and forefinger a firm purchase where the bills of the snap-hook are being opened by squeeze pressure of the fingers. This flat seat for the fingers enables the user to stabilize the snap-hook as against the tendency for wire of the normal circular cross-section to turn in the hand. Represented in Fig. 4 is the manner in which the link L is disengaged from the snap-hook. The user here catches one of the two branches between thumb and forefinger and pulls outwardly as shown by the arrow C while at the same time grasping the link L with the other hand and pulling in the opposite direction, shown by arrow D. This spreads the branches so as to open the bills and the link is then fed (see arrow E) from the concerned branch onto the related bill while maintaining the outward pull. When the link has passed jog 17 and reached the bill proper the snap-hook may be relieved of the spreading force, the link then being easily moved along the remaining length of the bill to the free end thereof.

The process of producing the hook, the several novel features of its construction, and the advantages achieved are each thought to have been clearly understood from the foregoing description. While the device as it is illustrated and particularly described represents my now-preferred embodiment it is believed to be obvious that minor changes in the structural details may be resorted to without departing from the spirit of the invention and it is accordingly my intention that no limitations be implied and that the hereto-annexed claims be given the broadest interpretation to which the employed language fairly admits.

What I claim is:

1. The method of producing a snap-hook from a continuous length of spring wire of normal circular cross-section which comprises doubling the wire upon itself to produce a tensioning loop comprehending within its circumferential span somewhat less than a full circle from which the free ends of the wire extend forwardly as straight branches, and at the same time subjecting substantial portions of each branch lying to the front of said loop to a flattening deformation widening the same in a direction normal to the plane of the loop, hooking the non-deformed free extremities of the branches inwardly to bring the same into lapping registration in a plane approximately the same as that occupied by the loop, coining the two hooked branches to produce an offset occurring at the root juncture of each bill with its supporting shank and such as brings the upper face of each bill's extreme end more or less flush with the shank of the bill which it overlies, and finally volutely tensioning the snap-hook by deflecting the two shanks in opposite directions from the general plane of the hook and converse to the direction in which the related branch is coined.

2. The method of claim 1 in which the doubling step is so performed that the tensioning loop comprehends within its circumferential span somewhat more than a half circle and has the free ends of the wire first converging inwardly for a short distance and then diverging outwardly as straight branches, the flattening deformation being performed upon said converging runs and a substantial portion of the diverging runs, and wherein the volute tensioning is accomplished by imposing reverse bends upon each said deformed length of the two branches with the deflection which is directed converse to the direction of the related coining being imposed upon the diverging run.

3. The method of claim 1 including the step of swaging the bill ends, and which is to say the portions thereof which overlie the offsets, to give to the underside of each said bill-end a concave configuration in transverse section establishing a mating fit with the convex upper face of the related offset.

References Cited in the file of this patent

UNITED STATES PATENTS

| 184,211 | Jones | Nov. 7, 1876 |
| 533,433 | Breul | Feb. 5, 1895 |
| 548,694 | Breul | Oct. 29, 1895 |
| 1,070,431 | Elliott | Aug. 19, 1913 |
| 1,567,851 | Lorber | Dec. 29, 1925 |

FOREIGN PATENTS

| 738,728 | France | Oct. 18, 1932 |